3,463,752
THERMOPLASTIC POLYMER OF A MONOOLEFIN
Norman D. Bornstein, Spartanburg, S.C., assignor to W. R. Grace & Co., Duncan, S.C., a corporation of Connecticut
No Drawing. Filed Apr. 2, 1965, Ser. No. 445,261
Int. Cl. C08f 3/08
U.S. Cl. 260—27    3 Claims

ABSTRACT OF THE DISCLOSURE

This invention is directed to increasing the gas permeability of monoolefin films by incorporating an ester of a hydrogenated rosin into the film.

---

This invention relates to a polymer of a monoolefin. In one aspect the invention relates to improving the gas permeability of a polymer of a monoolefin.

It is well known to employ thermoplastic polymeric materials in the form of film or filaments. Especially useful are the polymers of monoolefins which have been extruded and formed into thin films. These films are employed in a multitude of ways, including the packaging of a wide variety of materials. These films are even more useful if they have been monoaxially or biaxially oriented to produce a film which will shrink when heat is applied to produce a skin-tight overwrap. The properties of each of these thermoplastic materials vary widely in such things as tensile strength, sealability, elongation, gloss, etc. An important property for many food products is the rate at which gases can permeate the film. The gas may evolve from the food itself, be trapped water vapor, or carbon dioxide, or the gas may be oxygen which must permeate into the inside of the package, e.g., certain red meat products.

It is an object of the invention to provide a novel thermoplastic polymeric material.

Still another object is to provide a novel polymer of a monoolefin composition.

Still another object is to provide an additive for a polymer of a monoolefin.

Still another object is to improve the gas permeability of a polymer of a monoolefin.

These and other objects of the invention will be readily apparent to those skilled in the art from the following disclosure and appended claims.

These objects are readily accomplished by incorporating into the thermoplastic polymer material an ester of a hydrogenated rosin. The rosin may be either partially hydrogenated, such as to a hydro- or dehydroabietic acid, or further hydrogenated to an alcohol, such as hydroabietyl alcohol.

The rosin derived from both oleoresin and aged stump wood are composed of approximately 90 percent resin acids and 10 percent non-acidic material. Resin acids are a mixture of monocarboxylic acids of alkylated hydrophenanthrene nuclei. In general, the resin acids are classified into two groups: The abietic type and the pimaric type. In general, the abietic type, such as abietic acid, is more useful because of the conjugated double bonds and the relative ease with which it may be converted. For simplicity, the discussion herein will be directed to abietic acid although it is to be understood that the invention is broadly applicable to resin acids. The abietic acid may be reacted in a number of ways, such as hydrogenation, which decreases the susceptability of rosin to air oxidation. Either one or both double bonds may be saturated by hydrogenation to form a hydro- or dehydroabietic acid. The acid may also be completely hydrogenated to produce hydroabietyl alcohol by well known methods. The carboxyl group of the resin acids is attached to a tertiary carbon atom and is thus highly hindered. However, polyhydric as well as monohydric alcohols may be reacted with the hydrogenated abietic acid to bring about esterification. Particularly useful alcohols are ethylene glycol, diethylene glycol, triethylene glycol, glycerol, diglycerol pentaerythritol and the like. The hydroabietyl alcohol may be esterified with inorganic and organic acids to produce resin esters useful as additives for the polymers of monoolefins. Suitable acids include phthalic acid, maleic acid and the like.

Particularly useful materials in the composition of this invention are the esters of hydrogenated rosins including, but not limited, to hydrogenated methyl ester of rosin, ethylene glycol ester of hydrogenated rosin, diethylene glycol ester of hydrogenated rosin, triethylene glycol ester of hydrogenated rosin, glycerol ester of hydrogenated rosin, pentaerythritol ester of hydrogenated rosin and the like. Suitable esters of hydrogenated abietyl alcohol include the phthalate ester of hydroabietyl alcohol, maleate ester, succinate ester, terephthalate ester, adipate ester, fumarate ester, and the like. Particularly preferred additives include the glycerol ester of hydrogenated rosin and the phthalate ester of hydroabietyl alcohol. In addition, the rosins may be purified prior to hydrogenation and esterification or they may be modified such as by reaction with maleic acid, fumaric acid, phenol and the like.

It has been surprisingly found that minor amounts of these additives incorporated in a polymer of a monoolefin improves the physical characteristics of the polymer. A particularly useful improvement is the increased rate of gas permeability, especially oxygen or air permeability, although permeability is also increased for $CO_2$, $N_2$ and the like. The increase in transmission ranges from 10 percent to 500 percent and more depending on such factors as amount of ester, film thickness, and the like.

As employed herein, gas permeability is determined by placing the film specimen in a sealed cell so that the film completely separates the upper and lower sections of the cell. The cell and contents are maintained at room temperature (73° F.±2° F.) throughout the test. The top section is purged with dry nitrogen overnight. Dry oxygen (or gas to be tested) is introduced into the lower cell section and is permitted to permeate through the film for a predetermined period of time. The mixture of nitrogen and oxygen in the top section is introduced into a Holdane-Henderson-Orsat gas analysis apparatus. The oxygen in a sample is determined by absorption of the oxygen. The film thickness is determined in mils with a micrometer. The transmission rate is calculated in cc. (24 hours, sq. meter, atm.). The permeability is calculated in cc. (mil, 24 hours, sq. meter, atm).

The invention is broadly applicable to thermoplastic polymeric materials. Particularly useful are the polymers of a monoolefin, such as those having from two to six, inclusive, carbon atoms per molecule, including, but not limited to, polyethylene, polypropylene, polybutene-1, polypentene, polyhexene and the like. Particularly preferred are polypropylene and polyethylene. The term polymer as employed herein includes homopolymers, copolymers, block copolymers, random copolymers, graft copolymers, laminates and the like.

Preferably, the ester is incorporated in the polymer in an amount sufficient to increase the rate of gas permeability, preferably oxygen permeability, through the film; more particularly, the amount of additive is in the range of 0.1 to 30.0 weight percent based on total composition weight, even more preferably, 5.0 to 20.0 weight percent.

The ester may be incorporated into the polymer by any suitable means. For example, the polymer and ester are dry mixed (or blended in an extruder, extruded and pelletized) and then introduced into an extruder from which they are extruded at a temperature above the melting point of the polymer. The blend is then extruded to form a sheet or tubing which is cooled to below said melting point, heated so slightly below the melting point and biaxially oriented into a heat shrinkable film. Orientation may be accomplished in any suitable manner, e.g., stretching on a tenter frame or by blowing a bubble. The selection of extrusion and orienting conditions is well within the skill of the art. In the case of polyethylene, the tape or tubing or sheet from the extruder may be irradiated prior to orientation, as best illustrated in the patents to Baird, U.S. 3,022,543, and to Rainer et al., U.S. 2,877,500, incorporated herein by reference.

The polymer composition may also include fillers, reinforcing agents, pigments, stabilizers, plasticizers, and the like.

The invention is best illustrated by the following examples:

EXAMPLE I

An intimate blend of 20 weight parts of a phthalate ester of hydroabietyl alcohol (Cellolyn 21, Hercules Powder Co.), was prepared by mixing in a twin screw extruder to form a homogeneous blend. The blend was extruded through an annular die, cooled to form a tubing, reheated and biaxially oriented to form a film. A section of the film was cut into four equal sections and oxygen transmission rates determined as hereinbefore described. Permeability rates were then calculated based on 1 mil. Film thicknesses were determined by a micrometer. The results are tabulated in Table I following.

The tapes of the polymer blends were biaxially oriented by first cutting the extruded, cooled tubing into about 2-foot sections. The section of tubing was then placed in a "batch racker" where the ends of the tubing were held. A middle portion of the tubing was heated to racking temperature, i.e., below the softening point, and then air was introduced into one end of the tubing. The hot section of the tubing then expands to form a bubble thereby biaxially orienting the film. The bubble is then cooled.

TABLE I

| Run No. | Film thickness, Mils | Transmission rate, cc. (24 hrs., meters$^2$, atm.) | Permeability rate, cc. (1 mil, 24 hrs., meters$^2$, atm.) (calculated) |
|---|---|---|---|
| 1 | 0.85 | 10,990 | 9,330 |
| 2 | 0.51 | 10,910 | 5,570 |
| 3 | 0.52 | 14,190 | 7,370 |
| 4 | 0.27 | 36,340 | 9,880 |

A similarly prepared biaxially oriented polypropylene without the ester had a permeability of about 1700 cc. (1 mil, 24 hrs., atm., meters$^2$). These data demonstrate that a minor amount of a phthalate ester of hydroabietyl alcohol provides a 4–8 fold and more increase in oxygen permeability. Runs 1–4 are identical except for the use of different cells and the difficulty in obtaining a true average film thickness which helps to explain the slight difference in results.

EXAMPLE II

Four sets of biaxially oriented polymers were prepared by mixing polymer pellets and ester in a twin screw extruder and extruding the blend which was then pelletized by "chopping" the molten extrudate. The blend pellets were then extruded through an annular die to form a tape which was irradiated to approximately 12 megarads (see Baird and Rainer patents, supra). The irradiated tape was then batch racked as hereinbefore described. The polymer in all four sets was a medium density polyethylene comprising a blend of low density polyethylene and a copolymer of ethylene and butene-1. Four determinations were made for each polymer-ester blend. In runs 1–8 the film thickness average is given. In runs 9–16 the range of film thicknesses for a given sample is given. Consequently, the calculated values for film permeability in runs 9–16 are not too consistent but in all cases represent an improvement over a permeability of about 3500 cc. (1 mil, 24 hrs., atm., meters$^2$) for the polymer without the ester. The results are tabulated in Table II as follows:

TABLE II

| Run No: | Polymer, amt., wt. parts | Additive Type | Amt., wt. parts | Film thickness | Transmission cc. (24 hrs., atm. meters$^2$) | Permeability cc. (1 mil, 24 hrs., atm. meters$^2$) (calculated) |
|---|---|---|---|---|---|---|
| 1 | 90 | Phthalate ester of hydroabietyl alcohol.[1] | 10 | 0.48 | 25,740 | 12,350 |
| 2 | 90 | do | 10 | 0.50 | 22,610 | 11,305 |
| 3 | 90 | do | 10 | 0.44 | 22,860 | 10,100 |
| 4 | 90 | do | 10 | 0.57 | 18,910 | 10,750 |
| 5 | 80 | do | 20 | 0.65 | 9,940 | 6,470 |
| 6 | 80 | do | 20 | 0.45 | 17,040 | 7,660 |
| 7 | 80 | do | 20 | 0.61 | 13,120 | 8,000 |
| 8 | 80 | do | 20 | 0.55 | 11,320 | 6,240 |
|   |   |   |   | Range |   | Range / Avg. |
| 9 | 90 | Glycerol ester of hydrogenated rosin.[2] | 10 | 0.25/0.41 | 26,670 | 6,600/10,910  8,785 |
| 10 | 90 | do | 10 | 0.52/0.67 | 24,600 | 12,800/16,500  14,650 |
| 11 | 90 | do | 10 | 0.36/0.72 | 11,140 | 3,740/7,460  5,600 |
| 12 | 90 | do | 10 | 0.51/1.27 | 8,480 | 4,330/6,680  5,500 |
| 13 | 80 | do | 20 | 0.31/0.85 | 12,060 | 3,770/10,240  7,000 |
| 14 | 80 | do | 20 | 0.42/0.54 | 9,590 | 4,030/5,170  4,600 |
| 15 | 80 | do | 20 | 0.41/0.54 | 11,910 | 4,880/6,440  5,620 |
| 16 | 80 | do | 20 | 0.30/0.56 | 15,690 | 4,710/8,790  6,750 |

[1] Cellolyn ®21, Acid No.=8, 75% resin solids in toluene, 145° F. softening point by Hercules Drop Method, Hercules Powder Co.
[2] Staybelite Ester, Acid No.=5, 100% resin solids, viscous liquid, Gardner-Holdt viscosity at 25° C.=380, Hercules Powder Co.

I claim:

1. A composition comprising a major amount of polypropylene and a minor amount of a phthalate ester of hydroabietyl alcohol; said minor amount being sufficient to provide a composition having a rate of gas permeability greater than the rate of gas permeability of said polymer.

2. A composition of claim 1 wherein said minor amount is in the range of 0.1 to 30.0 weight percent based on total weight of said composition.

3. An article comprising a biaxially oriented film prepared from a composition comprising polypropylene and a phthalate ester of hydroabietyl alcohol said ester being present in an amount ranging from 5.0 percent to 20.0 percent based on total composition weight to provide a rate of oxygen permeability through said film greater than the rate of oxygen permeability through said polypropylene.

References Cited

UNITED STATES PATENTS

| | | | |
|---|---|---|---|
| 3,220,966 | 11/1965 | Flanagan | 260—27 |
| 3,240,735 | 3/1966 | Caldwell et al. | 260—26 |
| 3,313,754 | 4/1967 | Logan | 260—27 |

DONALD E. CZAJA, Primary Examiner

WILLIAM E. PARKER, Assistant Examiner

U.S. Cl. X.R.

204—159.2; 264—22